United States Patent [19]
Hollaway

[11] Patent Number: 5,670,846
[45] Date of Patent: Sep. 23, 1997

[54] FULL POWER LIGHT CONTROL

[76] Inventor: Jerrell P. Hollaway, 1330 Meadowbrook Rd., Palm Bay, Fla. 32905

[21] Appl. No.: 511,884

[22] Filed: Aug. 7, 1995

[51] Int. Cl.[6] .................................................. H05B 37/02
[52] U.S. Cl. .......................... 315/151; 315/156; 315/159; 250/206
[58] Field of Search ................................ 315/159, 151, 315/156, 360; 250/206

[56] References Cited

U.S. PATENT DOCUMENTS

| | | | |
|---|---|---|---|
| 4,139,801 | 2/1979 | Linares | 315/83 |
| 4,198,563 | 4/1980 | Elssner | 250/214 AL |
| 4,287,453 | 9/1981 | Orban | 315/159 |
| 4,595,860 | 6/1986 | Taylor | 315/158 |
| 4,697,122 | 9/1987 | Hotter | 315/158 |
| 5,554,912 | 9/1996 | Thayer et al. | 315/157 |

*Primary Examiner*—Robert Pascal
*Assistant Examiner*—David Vu

[57] ABSTRACT

A photoelectric control circuit that energizes a light bulb at a certain level of darkness and immediately records the total amount of light that results. A delay circuit prevents the new level of light from turning the bulb back off until a even greater amount of light is available. This method of operation provides full power control for a variety of lamps and bulbs without the degraded performance previously associated with reflected light from enclosures and nearby objects.

10 Claims, 2 Drawing Sheets

FULL POWER LIGHT CONTROL

BACKGROUND OF THE INVENTION

This invention relates to photoelectric controls used to energize lamps in a dusk-to-dawn mode of operation.

For reasons of both security and convenience, it has become a common practice to control certain lamps and fixtures around a home or business with photoelectric control devices. In the most common form, these devices consist of a photocell, or light-sensitive resistor, and a power switch, such as a triac, coupled together with other components to form a simple phase control circuit. This type of circuit operates by delaying the point in time during the alternating current (AC) cycle that the triac is allowed to conduct. When the amount of light reaching the photocell is high, the phase angle is large and the light will be dim or completely off. When the amount of light is low, the phase angle is, initially, small and the bulb receives most of the power available during the AC cycle. Unfortunately, as soon as the bulb is energized the amount of light near the lamp is greatly increased, and if any reflection of the bulb's light reaches the photocell, the phase angle is immediately increased and the power to the bulb is diminished. Of course the diminished power now reduces the bulb's light output. This cycle may then repeat and lead to a continual series of increases and decreases of light output, or flicker. At best, the final power applied to the bulb is less than the total available, which is often unsatisfactory. Also, partial power makes the control unsuitable for controlling fluorescent devices.

An object of the present invention is to provide a photoelectric control that provides no power to the bulb during periods of high ambient light and full power to the bulb during periods of low ambient light. Another object is to energize and de-energize the bulb instantly, at full power, so that the appearance of the light cannot be distinguished from that which would result from someone using a mechanical switch somewhere in the circuit. This types of action provides better security because it suggests presence of a person.

A final objective is to provide a design which results in a small and inexpensive product that can readily be used in homes and businesses.

SUMMARY OF THE INVENTION

Disclosed herein is a photoelectric light control that uses a photocell in a resistor network for sensing light, a resistor-capacitor delay circuit, a series of logic gates to create memory and latching functions, and a pair of triacs as a power switch. When darkness causes the bulb to be energized the new light level will cause some number of the series of logic gates that serve as digital memory to be switched on, but the delay circuit will prevent the logic gates from causing the bulb to be de-energized at this time. Later, when the ambient light level increases at dawn, the next logic gate in series that remained off will be switched on, and since the delay period is now over, this logic gate will cause the bulb to be de-energized.

DESCRIPTION OF PREFERRED EMBODIMENTS

Figure 1:
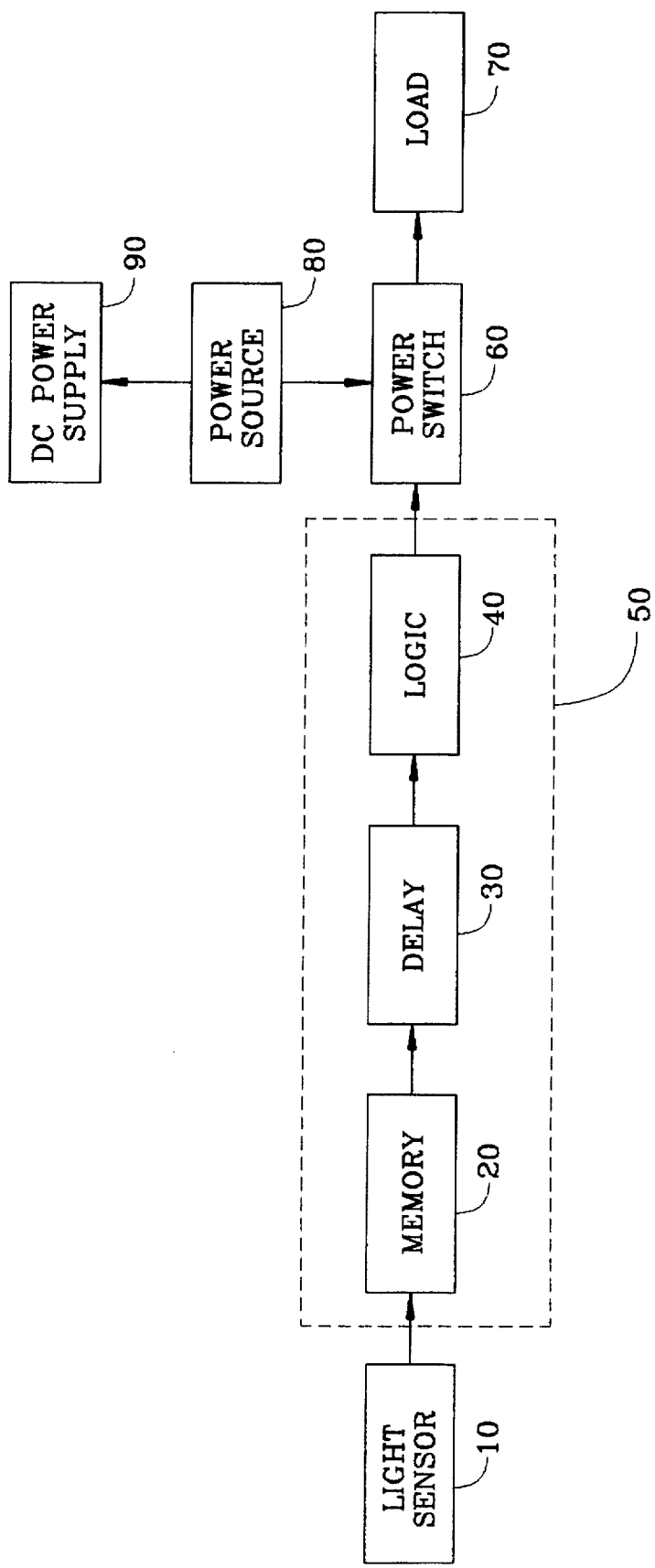
FIG. 1 is a schematic block diagram of the present invention.

Referring to FIG. 1, light sensor 10 may include one of several devices such as a photodiode or a photocell connected in a light circuit so as to produce electrical signals that are representative of the amount of light reaching the device. The electrical signals so produced are connected as input signals to the combination of memory means 20, delay means 30, and logic means 40 in such a manner that output signals will be produced by logic means 40. These output signals are coupled to power switch 60 so that power source 80 will be selectively applied to load 70 according to the output signals from logic means 40.

The input signals from light sensor 10 are, of course, analog signals. These analog signals can easily be converted to digital representations of the input signals in a number of ways. Once converted, the signals can be recorded in some form of digital memory.

In certain forms of the present invention, some or all of the functions of memory 20, delay 30, and logic 40 may be performed by digital computer 50, such as a microcontroller with analog-to-digital conversion capabilities. Memory 20 would include the on-chip solid state memory of the microcontroller. Delay 30 and logic 40 functions could be achieved by calculations in the programmed instructions of digital computer 50.

Power switch 60 can employ a number of devices. Most commonly, relays or triacs are used for this purpose.

Load 70 may be a light bulb or a more complex light producing device, such as a fluorescent lamp and ballast combination or a fluorescent lamp with an integral electronic circuit.

Power source 80 can be almost any type of electric power, including AC or DC, within a wide range of voltages. DC power supply 90 consist of the appropriate circuit elements necessary to convert the power from power source 80 to a level and type of power suitable for use by the other components of the control, typically 5–15 volt, DC power.

In operation, light sensor 10 sends input signals to memory 20 representing the amount of ambient light present. As dusk approaches, a change in the input signal stored in memory 20 may occur. Logic 40 will recognize this difference in input signals and activate power switch 60. Power switch 60 will then energize load 70, a light producing device. The new light that results from this action will now add to the ambient light that was present immediately prior to the load being energized, and, if there exist any possibilities for reflections to light sensor 10, may result in new input signals to memory 20. Due to the operation of delay 30, however, logic 40 will not produce a change in output signals at this first point in time. The load, therefore, will remain on at full power.

Later, at or beyond a second point in time defined by delay 30, the total amount of light reaching sensor 10 may become somewhat greater (as would occur at dawn). Memory 20 may then assume a different value. Logic 40 is designed to react to such a change and to produce an output signal to power switch 60 which will fully de-energize load 70.

Figure 2:
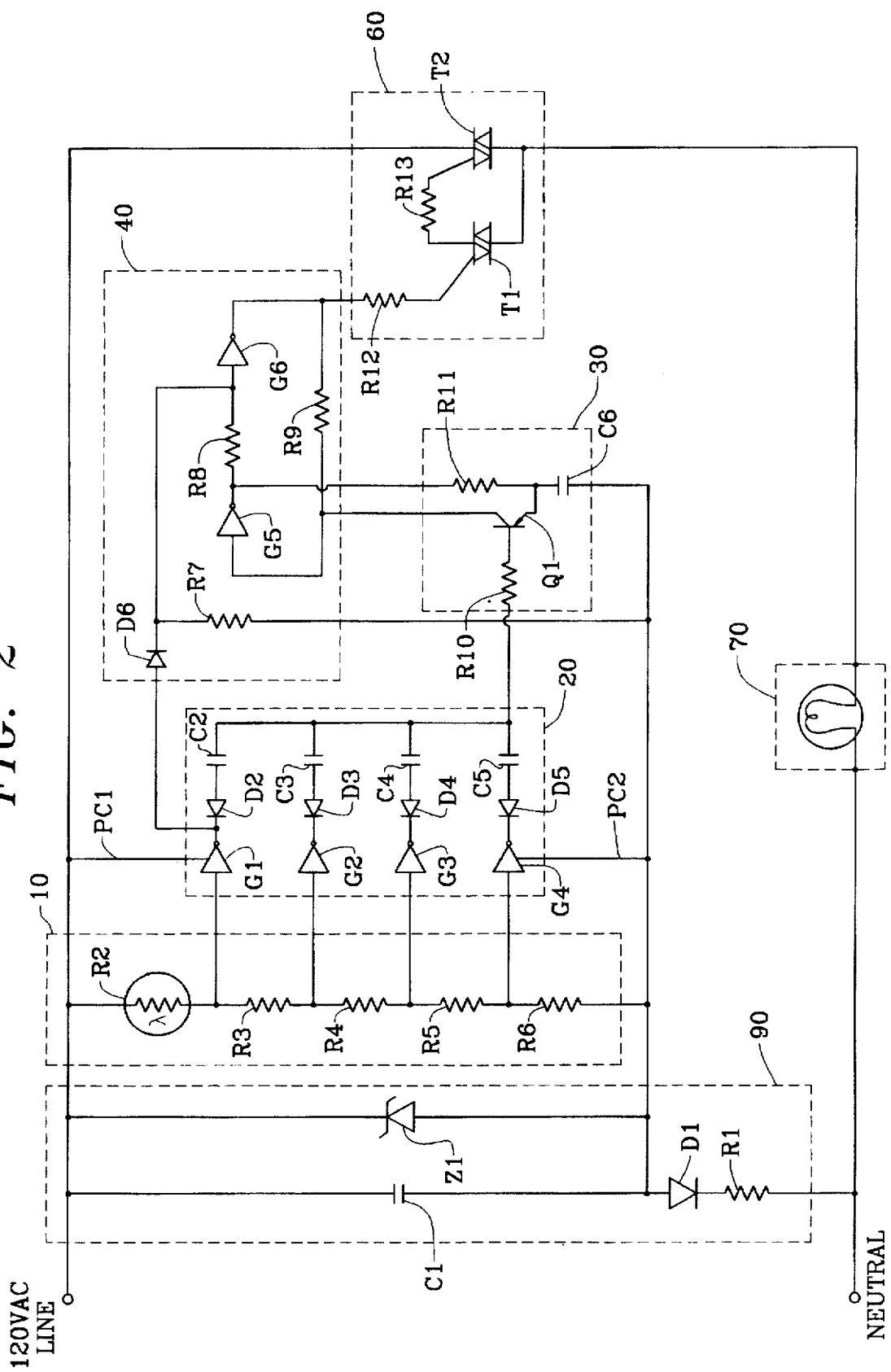
FIG. 2 is a more detailed schematic circuit of a preferred embodiment of the present invention.

Referring now to FIG. 2, a detailed arrangement of a preferred embodiment will be described.

Power supply 90 converts 120 volt AC power to a lower DC voltage using diode D1 as a half wave rectifier, resistor R1 as a voltage dropping resistor, capacitor C1 as a filter, and zener diode Z1 as a voltage regulator in an arrangement which is well known.

Light sensor 10 is comprised of light-sensitive resistor R2 connected together with resistors R3, R4, R5 and R6 in a voltage divider network.

Memory 20 is comprised of gates G1, G2, G3 and G4; diodes D2, D3, D4 and D5; and capacitors C2, C3, C4 and C5. Gates G1, G2, G3, and G4 are inverting gates in this embodiment and are preferably of the CMOS type, and are also preferably of the schmidt trigger type. The power connections for all gates are connected to the outputs of power supply 90 as illustrated by power connections PC1 and PC2. The input signals from light sensor 10 which appear at each node of the voltage divider network are connected to the inputs of individual gates. The output of each gate is connected to the cathode of an individual diode D2, D3, D4 or D5. The cathode of each diode is then connected to one side of an individual capacitor C2, C3, C4 or C5 with the other sides of these capacitors connected together and to resistor R10 of delay 30.

Delay 30 consists of capacitor C6 which has one side connected to the anode of D1; resistor R11 connected between the other side of C6 and logic 40; PNP transistor Q1 with the emitter connected to the junction of C6 and R11, the collector connected to logic 40, and the base connected to memory 20 through R10.

Logic 40 is comprised of gates G5 and G6; resistors 7, 8 and 9; and diode D6. The output of G5 is connected to the input of G6 through resistor R8 and the output of G6 is connected to the input of G5 through resistor R9, thus creating a bi-stable latching circuit. Resistor R7 is connected to the anode of D1 in power supply 90. The cathode of diode D6 is connected to the input of G6 with the anode of D6 connected to the output of G1 in memory 20.

Power switch 60 consists of triacs T1 and T2 and resistors R12 and R13. R12 is connected between the output of G6 in logic 40 and the gate of T1. One main terminal of T1 is connected to the gate of T2 through R13. The other main terminal of T1 is connected to a first main terminal of T2. The first main terminal of T2 is also connected to one side of load 70. The second main terminal of T2 is connected to one side of power source 80. The other side of load 70, which may be a light bulb, is connected to the other side of power source 80.

In operation, the embodiment of FIG. 2 performs in the following manner. As the amount of ambient light begins to diminish at dusk, the input signals from light sensor 10 will gradually become lower and individual gates of memory 20 will begin to turn off (if on), starting with G4 which is connected to the lowest position in the voltage divider of 10. When a gate turns off, its output will go to the positive, or high voltage state. Except for G1, these transitions to high voltage have no effect on delay 30 or logic 40 due to the blocking actions of D2–D5.

If, or when, G1 turns off due to a significant loss of ambient light, the output of G1 will send a high voltage through D6 to the input of G6. The high voltage output of G1 will, because of the high resistance of R8, overcome the low voltage output of G5, which was previously providing a low voltage input to G6. The output of G6 will now switch to a low voltage state which, coupled through R9, will turn off G5. When G5 turns off, the output of G5 switches to the high voltage state which, coupled through R8, maintains a a high voltage input for G6. Thus logic 40 is latched into a state that provides a constant low voltage condition at the output of G6, which provides a current path for the gate of T1, causing the main terminals of T1 to be conductive. T1 now provides gate current to T2 through R13, making the main terminals of T2 conductive and thereby supplying power to load 70, the light bulb in this embodiment. Now, if reflected light from load 70 on R2 causes a change in the input signals from 10 and turns off G1, the state of 40 will be unchanged due to the blocking action of diode D6. If reflected light does, at this first point in time, turn off one or more of gates G1–G4, the resulting low voltage outputs will be transferred through the associated diode-capacitor paths of D2–D5 and C2–C5 to R10 in delay 30. However, at this first point in time, with the output of G5 just recently switching to the high voltage state, R11 has not had sufficient time to change C6 to a high voltage and emmitter-base current cannot flow in Q1. Therefore, the state of 40 will still be undisturbed and load 70 will remain fully energized.

After a short time, C6 will charge to a high voltage through R11. At this second point in time, memory 20 may contain some of gates G1–G4 in the on state and some in the off state, due to the input signals from 20. Generally, there will not be a further increase in the amount of light at R2 until dawn of the next day.

When a sufficiently large enough increase in light does occur at R2, after the charging of C6, the load will be de-energized when one or more gates that were previously off turn on. This occurs when one of the diode-capacitor paths of D2–D5 and C2–C5 presents a low voltage from the associated gate G1–G4 output to the base of Q1 through R10. The energy now in C6 will create emitter-base current which will cause Q1 to present nearly the full voltage of C6 to the input of G5. This momentary pulse of high voltage will turn on G5, which will turn off G6 which will then hold the input of G5 high in a stable state. Load 70 will now be de-energized in a manner similar, but in reverse, of that previously explained.

Resistor R7, not yet discussed, serves to initialize the bi-stable operation of 40 so that load 70 is de-energized when power source 80 is first applied to the control. This is accomplished because R7 is connected to the anode of D1 and presents a low voltage to the input of G6.

Many variations of the control, within the scope of this invention, are possible. The number of digital steps within the memory may be easily changed by adding or subtracting parts, for example. Also, the power switch shown uses a main triac and a driver triac to match the output available from a standard CMOS inverter product. An optical coupler could be used in place of T1, or T1 may even unnecessary in some products using a different part for T2. In fact, many other improvements and implementations may be possible and easily practiced by one skilled in the art of electronics without departing from the spirit and essence of what is taught herewithin.

I claim:

1. A light control apparatus comprising:
    a light sensing means which produces a light level signal representative of the amount of light present at said light sensing means;
    a time delay means which establishes a second point in time later than a first point in time;
    a memory means which records said light level signal at said first point in time;
    a logic means which produces output signals whenever said light level signal from said second point in time is different by a prescribed amount from said signal stored in said memory from said first point in time; and
    a power switching means coupled between a source of electrical power and a light producing device which controls the application of said power to said device in response to said output signals from said logic means.

2. An apparatus according to claim 1, wherein said light level signals from said light sensing means are converted from analog signals to digital representations of said signals and said digital representations are compared by said logic means.

3. An apparatus according to claim 2, wherein said logic means, said memory means, and said delay means are included in a digital computer.

4. An apparatus according to claim 1, wherein said light sensing means is a light-sensitive means connected to a voltage divider means to provide two or more of said light level signals, where said signals are present in accordance with the amount of light appearing on said light-sensitive means.

5. An apparatus according to claim 4, wherein said memory means is a digital memory means.

6. An apparatus according to claim 5, wherein said digital memory means consists of a series of gates with the inputs of said gates coupled to said light level signals so that the outputs of some of said gates change state according to the amount of said light present at said first point in time and the outputs of some others of said gates change state according to the amount of said light present at said second point in time.

7. The apparatus of claim 6, wherein said logic means consist of two or more logic gates coupled together to form a bi-stable latching circuit which is coupled to said light sensing means, said memory means, and said delay means such that a prescribed change in the amount of light at said light sensing means during said second point in time causes a change in said output signals from said latching circuit.

8. An apparatus according to claim 4, where said light-sensitive means is a light-sensitive resistor and said voltage divider means is a network of resistors.

9. An apparatus according to claim 1, wherein said delay means includes a capacitor.

10. A method of controlling power to an electric lamp including the steps of:
 sensing ambient light levels and energizing said lamp whenever a first said ambient light level is lower than a prescribed level;
 sensing and recording a second of said ambient light levels as soon as said lamp is energized;
 sensing a third of said ambient light levels that is greater than said second level by a prescribed amount and de-energized said lamp.

* * * * *